Figure 1A:
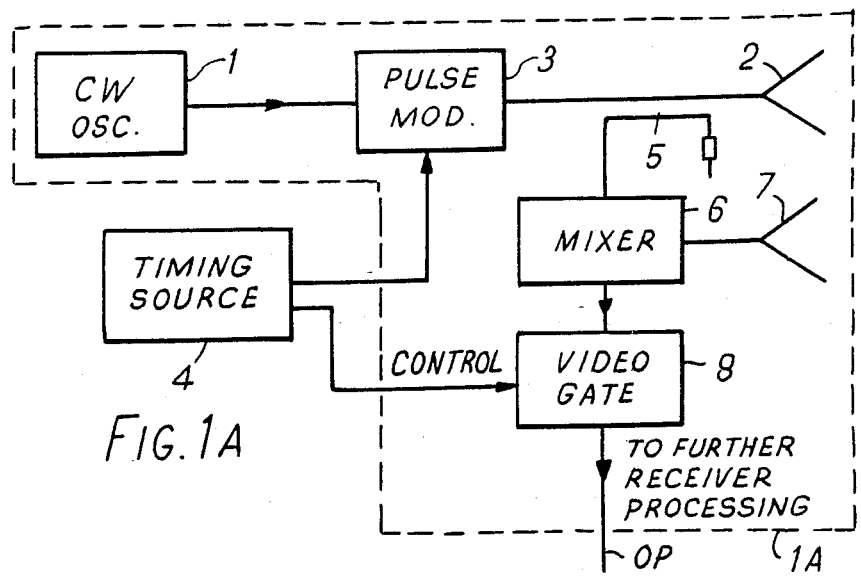

United States Patent [19]

Cashen et al.

[11] Patent Number: 4,908,628
[45] Date of Patent: Mar. 13, 1990

[54] RADAR APPARATUS

[75] Inventors: Ernest R. Cashen, Shepton Mallet; Peter A. R. Holder, Bristol, both of England

[73] Assignee: E M I Limited, Hayes, England

[21] Appl. No.: 285,394

[22] Filed: Jul. 7, 1981

[30] Foreign Application Priority Data

Jul. 7, 1980 [GB] United Kingdom ............... 8021850
May 8, 1981 [GB] United Kingdom ............... 8114114

[51] Int. Cl.$^4$ .............................................. G01S 13/18
[52] U.S. Cl. .................................... 342/134; 342/68
[58] Field of Search ............... 343/5 PD, 7 PF, 13 R; 342/68, 134, 135

[56] References Cited

U.S. PATENT DOCUMENTS 3,076,191  1/1963  Williams ..................... 343/7 P FX
3,142,058  7/1964  Rhodes ........................ 343/13 R
3,353,179  11/1967  Cartwright ................. 343/13 R
4,310,842  1/1982  Siebeneck et al. ............ 343/5 PD Primary Examiner—T. H. Tubbesing
Attorney, Agent, or Firm—Fleit, Jacobson, Cohn, Price, Holman & Stern

[57] ABSTRACT

A radar apparatus transmits a pulse and receives a corresponding return within the duration of the transmitted pulse. The returned pulse and a proportion of the energy of the transmitted pulse are mixed in a mixer to produce a demodulated pulse of duration equal to the overlap in time of the transmitted and received pulses. In order to render the apparatus insensitive to close targets a video gate prevents the portion of the demodulated pulse corresponding to e.g. 0 to ¼ full range passing to a processing circuit. The processing circuit forms the ratio of the amplitudes of two frequency components of the spectrum of the demodulated pulse as a measure of range (FIG. 3) or forms the mean amplitude of the demodulated pulse weighted according to a weighting function (FIG. 4).

3 Claims, 4 Drawing Sheets a. TRANSMITTER WAVEFORM b. L.O WAVEFORM c. TARGET RETURN AT ZERO RANGE d. MIXER OUTPUT FOR ZERO RANGE TARGET e. TARGET RETURN AT ¼ RANGE f. MIXER OUTPUT FOR ¼ RANGE TARGET

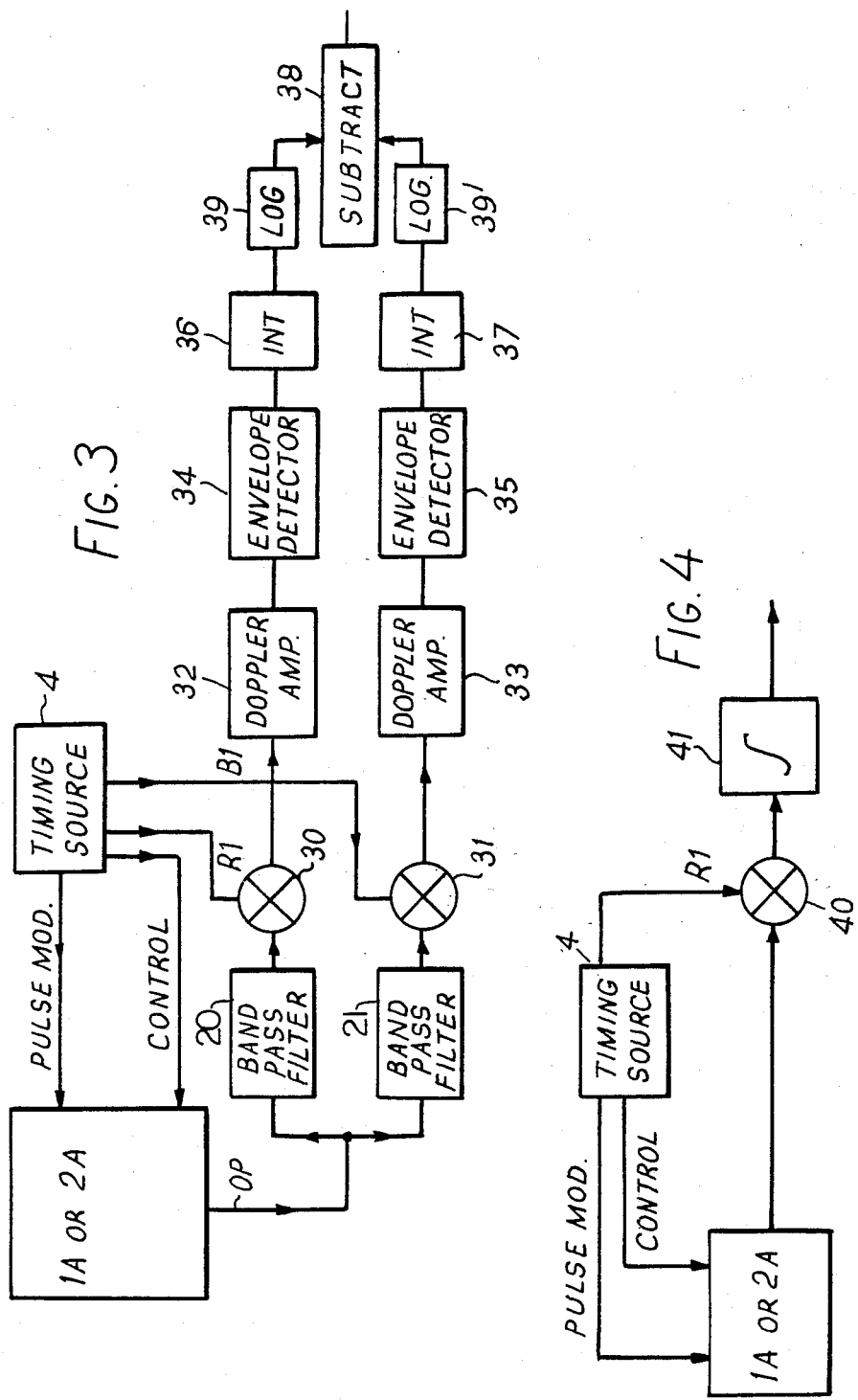

RADAR APPARATUS

BACKGROUND OF THE INVENTION

The present invention relates to a radar apparatus.

It is well known to make a radar sensitive to targets at a preset range and insensitive to targets outside the range, by using a range gate. The gate may be opened in response to a portion of the energy of a transmitted pulse, the portion being applied to the gate by a delay line. In some applications of radar, space is severely restricted and there is insufficient room for a delay line.

It is an object of the present invention to provide a radar apparatus which is insensitive to targets outside a desired range.

SUMMARY OF THE INVENTION

According to the invention, there is provided a radar apparatus comprising means for transmitting pulses of electromagnetic energy and for receiving corresponding return pulses gating means selectively operable in response to control signals to have a first state in which it does not pass a substantial amount of electromagnetic energy from an input to an output, and a second state in which it does pass electromagnetic energy from the input to the output, timing means arranged to produce control signals for causing the transmitting means to transmit a pulse of predetermined duration and to select the first state of the gating means for a first predetermined portion of a time duration equal to the duration of the transmitted pulse, and to select the second state for a second portion of that duration, to produce a modified pulse of duration equal to the common interval of occurrence of the second state and the return pulse, and means for processing the modified pulse to derive range information therefrom.

Figure 1B:
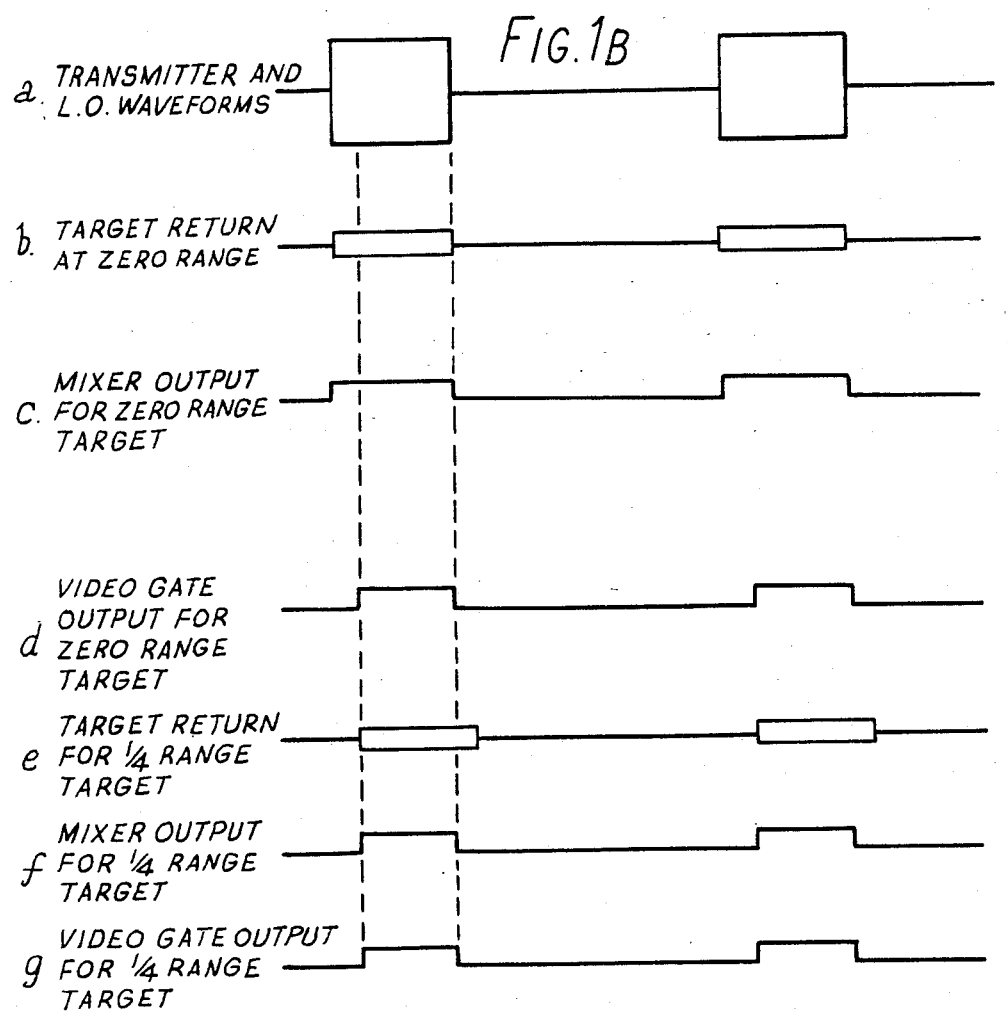
Figure 2A:
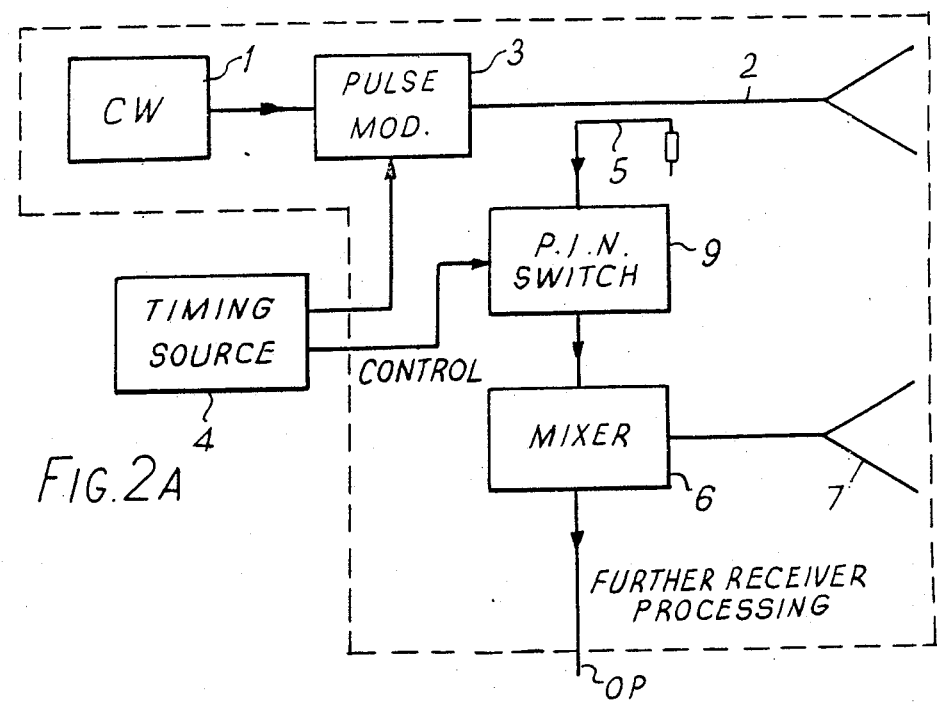
Figure 2B:
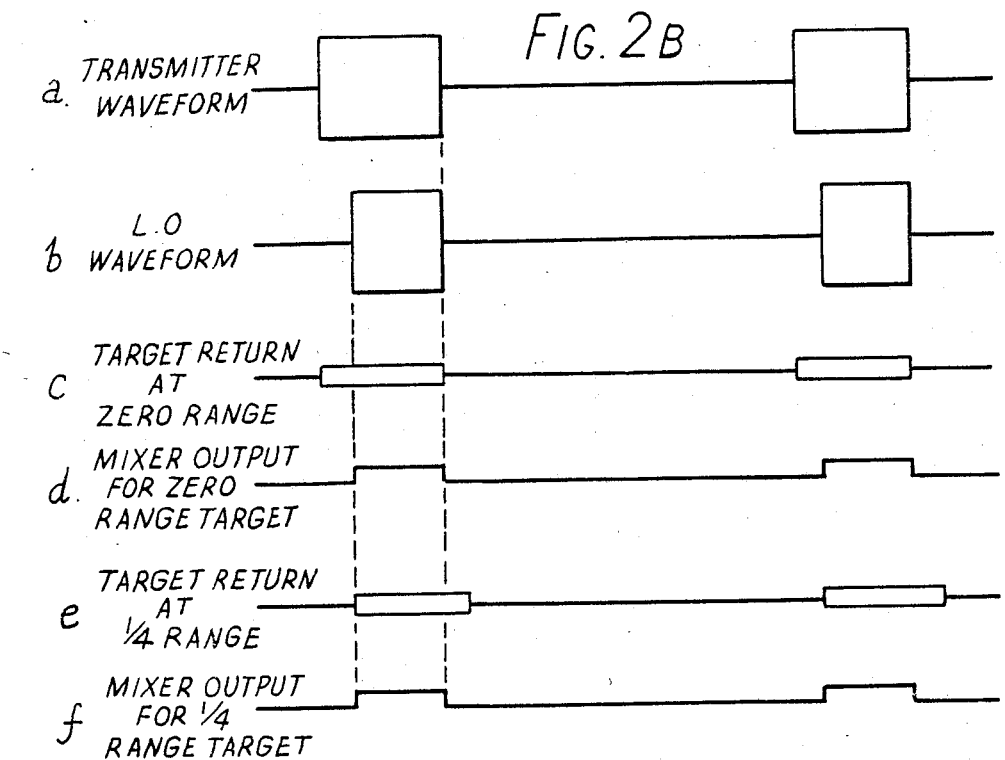
Figure 5A:
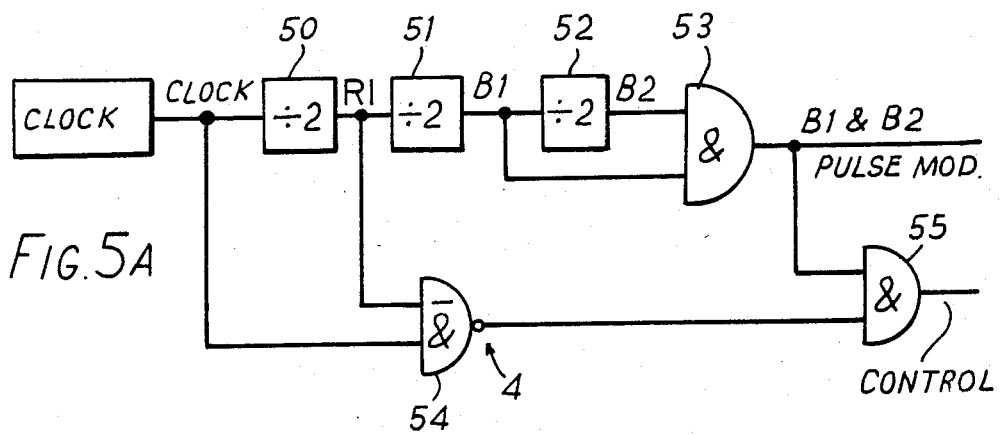

For a better understanding of the present invention, reference will now be made, by way of example, to the accompanying drawings in which:

FIG. 1A is a schematic block diagram of part of a radar apparatus according to the invention, FIG. 1B comprises schematic signal amplitude—time diagrams explaining the operation of the apparatus, FIG. 2A is a schematic block diagram of part of another radar apparatus according to the invention, FIG. 2B comprises schematic signal amplitude - time diagrams explaining the operation of the apparatus, FIGS. 3 and 4 show schematic diagrams of alternative signal processors, FIG. 5A is a schematic block diagram of the timing source of the apparatus of FIGS. 1 to 4, and FIG. 5B comprises signal amplitude time diagrams explaining the operation of the source of FIG. 5A.

The apparatus of FIG. 1A comprises a continuous wave oscillator 1 which is periodically connected to a transmitter aerial 2 by a pulse modulator 3 which is controlled by a timing source 4 to produce a pulse train for transmission. A pulse train may also be produced by direct pulse modulation of an oscillator. A coupler 5 couples a mixer 6 to the output of the modulator 3 so that the mixer receives a portion of the transmitted energy as a local oscillator signal LO. The mixer 6 mixes the signal LO with radar returns received by a receiver aerial 7.

As shown in FIG. 1B, each transmitted pulse and thus also the local oscillator signal LO, waveform a overlaps, i.e. occur at the same time as, at least a portion of the corresponding return, waveform b, and so the mixer produces an output in the form of a modified pulse of duration equal to the duration of the common occurence of the transmitted and received pulses. Waveform a, b and c of FIG. 1B are shown for zero range for which the overlap of the signal LO and the return is a maximum, and waveforms a, e and f of FIG. 1B show waveforms for ¼ range for which overlap is less. At maximum range, the return does not overlap at all with the transmitted pulse and signal LO. Clearly, the amount of overlap is a measure of range.

A video gate circuit 8 is provided at the output of the mixer 6. The gate is controlled by a control signal from the timing source 4 to pass only that portion of the output of the mixer occurring during a predetermined time interval to the output OP of the apparatus of FIG. 1A.

In the example shown in FIGS. 1A and B, the gate 8 is controlled to allow only the portion of the output of the mixer corresponding to ¼ range to maximum range to pass the output OP. This makes the apparatus insensitive to targets at less than ¼ range, because as can be seen from a comparison of waveforms d and g of FIG. 1B which show the output of the gate, that output is the same for zero range as it is for ¼ range. Other proportions, between 0 to 1 of the maximum range can be chosen.

FIGS. 2A and 2B show another apparatus which differs from the apparatus of FIGS. 1A and 1B in that the gate 8 at the output of the mixer 6 is replaced by a P.I.N. switch 9 interposed between the coupler 5 and the mixer 6. The PIN switch is controlled by the control signal in the same way as the gate 8 so that, instead of the mixer output being controlled, the Local Oscillator signal LO is controlled. As shown in FIG. 2B, the transmitter waveform comprises a pulse (a) and at zero range the return (c) is equal in duration to, and wholly overlaps, the transmitted pulse, whilst at ¼ range the return (e) is equal in duration to the transmitted pulse but only partially overlaps it. The PIN switch 9 is controlled to couple the mixer 6 to the output of the modulator 3 only for the duration of common occurrence of a return of ¼ range (or more) and the transmitted pulse as shown by (b). Thus as shown by (d) and (f) the output of the mixer is the same for zero range, ¼ range and intermediate ranges.

The output of the mixer is a pulse of length depending on range according to the range law established by the apparatus of FIG. 1A or 2A. The pulse may be processed in various ways to extract the range information.

One way is illustrated in FIG. 3.

The apparatus of FIG. 3 operates to extract the range information in the manner described in British application No. 55243/73 (U.S. application Ser. No. 129,373 of 7 Mar., 1980). Briefly the apparatus of FIG. 3 operates in the following manner:

The spectrum of a pulsed waveform varies with pulse length. In particular the amplitudes of the spectral lines change with pulse length. The apparatus selects two lines of frequency $f_1$ and $f_2$ which are harmonically related to the pulse repetition frequency (for example) using mixers 30 and 31 to which reference signals R1 and B1 of frequency f, and f,/2 are applied. Additional band pass filters 20, 21 may be provided. The outputs of the mixers are applied to Doppler amplifiers 32, 33 and envelope detectors 34, 35 to produce signals representing the amplitudes of the selected lines. Integrators 36, 37 integrate the signals over the duration of several transmitted pulses. A signal representing the ratio of the amplitude is formed by using logarithmic amplifiers 39, 39' and a subtractor 38.

Another way of processing the pulsed output of the apparatus of FIG. 1A or 2A is illustrated in FIG. 4. The apparatus of FIG. 4 extracts range information in the manner described in copending British application No. 8021851, corresponding to U.S. application Ser. No. 285,393. Briefly, the range pulse is fed to a mixer 40 where it is mixed with a bipolar reference signal R1. The signal R1 has at least one polarity transition in the duration of the video gate to define inverted and non-inverted portions of the range pulse. An integrator 41 (which is practice is formed by a Doppler amplifier) integrates the said portions over the duration of the video gate. Thus the output of the integrator is the mean amplitude of the range pulse weighted according to the signal R1 which provides a weighting which is non-uniform over a range of durations of the range pulse.

Yet another way of processing the pulsed output is described in copending British application No. 8021849, corresponding to U.S. application Ser. No. 285,392, the contents of which are hereby incorporated into this specification.

Figure 5B:
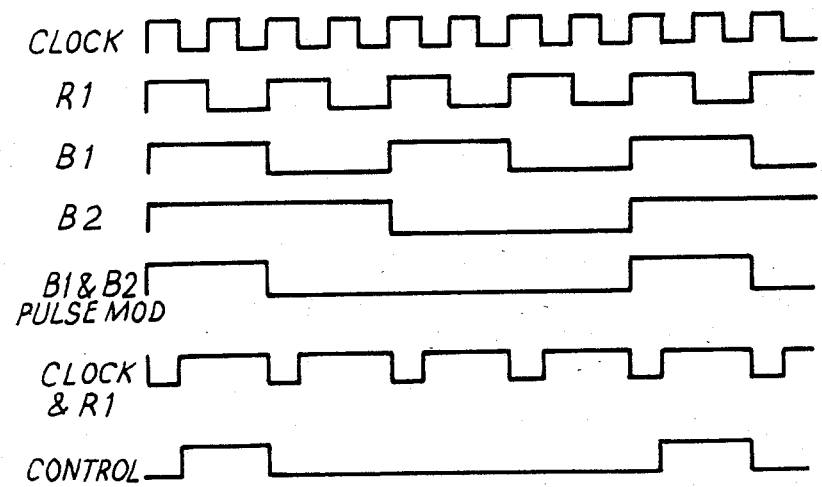

FIGS. 5A and 5B show an example of the timing source 4. A clock produces a pulsed waveform of frequency 2f, which is fed to successive bistables 50 and 51 to produce the signals R1 and B1. The signal B1 is applied, via a further bistable 52, to one input of an AND gate 53, and directly to the other input to produce the signals B1 and B2 for controlled pulse modulator 3. The signal for controlling the gate 8 or switch 9 is produced by combining the clock with R1 in a NAND gate 54 and combining the output of gate 54 with B1 and B2 in an AND gate 55.

What we claim is:

1. A radar apparatus comprising
    means for transmitting a pulse of electromagnetic energy and for receiving a corresponding return pulse,
    coupling means coupled to the pulse transmitting means to produce an electrical reference pulse having the same duration as the transmitted pulse,
    a mixer connected to receive the return pulse at a first input,
    switching means interconnecting said coupling means and a second input to the mixer and being selectively operable, in response to control signals, to assume first and second states in which said coupling means is respectively connected to, and disconnected from, said second input,
    timing means arranged to generate control signals for causing the pulse transmitting means to transmit a pulse of said duration and to select said first state of the switching means for a first predetermined portion of said duration and to select the second state for the remainder of the duration, so that a modified pulse of duration equal to the common interval of occurence of the second state and the return pulse is produced at the output of the mixer,
    and means for processing the modified pulse to derive range information therefrom.

2. Apparatus according to claim 1, wherein the processing means comprises
    means for producing a signal representing the mean amplitude of the modified pulse weighted according to a weighting function which is non-uniform over at least a range of durations of the modified pulse.

3. Apparatus according to claim 1, wherein the processing means comprises means for selecting a predetermined Doppler modulation of first and second different frequency components of the spectrum of the modified pulse, and means for producing a signal representing the ratio of the amplitudes of the modulating components.

* * * * *